(12) United States Patent (10) Patent No.: US 12,646,244 B2
Gogin et al. (45) Date of Patent: Jun. 2, 2026

(54) SYSTEM AND METHOD FOR DIAGNOSTIC IMAGING

(71) Applicant: GE Precision Healthcare LLC, Waukesha, WI (US)

(72) Inventors: Nicolas Gogin, Chatenay Malabry (FR); Jerome Knoplioch, Neuilly sur Seine (FR); Adele Courot, Paris (FR); Quang Minh Nguyen, Paris (FR); Heber Hernandez, Salt Lake City, UT (US)

(73) Assignee: GE Precision Healthcare LLC, Waukesha, WI (US)

( * ) Notice: Subject to any disclaimer, the term of this patent is extended or adjusted under 35 U.S.C. 154(b) by 224 days.

(21) Appl. No.: 18/537,502

(22) Filed: Dec. 12, 2023

(65) Prior Publication Data

US 2025/0191280 A1 Jun. 12, 2025

(51) Int. Cl.
*G06T 15/10* (2011.01)
*G06T 7/70* (2017.01)

(52) U.S. Cl.
CPC .............. *G06T 15/10* (2013.01); *G06T 7/70* (2017.01); *G06T 2200/04* (2013.01); *G06T 2200/24* (2013.01); *G06T 2207/30196* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2010/0041985 A1* | 2/2010 | Simon | A61B 6/463 |
| | | | 378/62 |
| 2013/0251233 A1* | 9/2013 | Yang | G06T 7/0014 |
| | | | 382/132 |
| 2015/0301719 A1* | 10/2015 | Shinde | G06F 3/04812 |
| | | | 715/808 |
| 2019/0021677 A1 | 1/2019 | Grbic | |
| 2020/0155236 A1* | 5/2020 | Chi | A61B 17/7074 |
| 2021/0128258 A1* | 5/2021 | Quaid | A61B 34/37 |
| 2022/0139029 A1* | 5/2022 | Birenbaum | G06F 3/0485 |
| | | | 715/784 |
| 2023/0394654 A1 | 12/2023 | Hampe | |

FOREIGN PATENT DOCUMENTS

EP 3809376 A2 4/2021

OTHER PUBLICATIONS

EP application 24213761.0 filed Nov. 19, 2024—extended Search Report issued May 2, 2025; 10 pages.
(Continued)

*Primary Examiner* — Edward Martello

(57) ABSTRACT

A computing system receives a first image of a three-dimensional object in a human body. The first image of the three-dimensional object includes a structure located in the three-dimensional object. The computing system receives an indication of a location of the structure in the first image. The computing system defines a main axis of the structure based on the indication of the location of the structure and an orientation of the structure. the computing system determines a two-dimensional plane along the main axis of the structure. The computing system generates a second image of the three-dimensional object and the structure along the two-dimensional plane.

14 Claims, 10 Drawing Sheets

100

(56) References Cited

OTHER PUBLICATIONS

Grotle et al., "Lumbar spine surgery across 15 years: trends, complications and reoperations in a longitudinal observational study from Norway", BMJ Open 2019;9:e028743. doi: 10.1136/bmjopen-2018-028743, 7 pages.

Martin et al., "Trends in Lumbar Fusion Procedure Rates and Associated Hospital Costs for Degenerative Spinal Diseases in the United States, 2004 to 2015." Spine (Phila Pa 1976). Mar. 1, 2019;44(5):369-376. doi: 10.1097/BRS.0000000000002822. PMID: 30074971, Abstract Only, 2 pages.

Rajaee et al., "National trends in revision spinal fusion in the USA," The Bone & Joint Journal, vol. 96-B No. 6, pp. 807-816, Published, Jun. 1, 2014, Abstract Only, 1 page.

* cited by examiner

100

Imaging Device 102

130

Computing System 104

Image Processing System 122

101

Computing System 104

Repository 402

Image Processing System 122

Processor(s) 404

Processor(s) 404

Processor(s) 404

Intake Module 410

Training Module 412

Machine Learning Model 414

Trained Model 416

Input Data 406

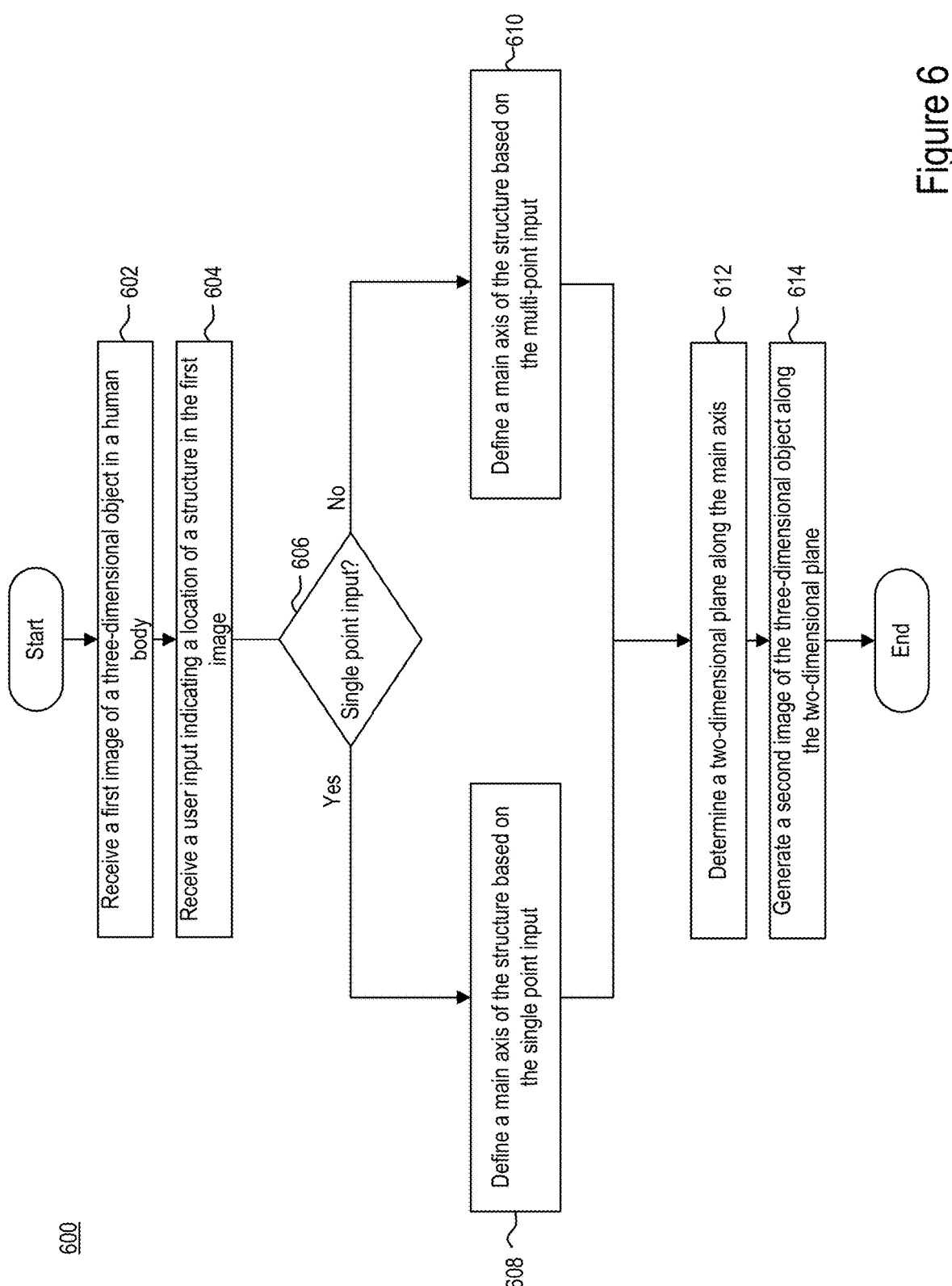

600

Start

Receive a first image of a three-dimensional object in a human body — 602

Receive a user input indicating a location of a structure in the first image — 604

Single point input? — 606

Yes

Define a main axis of the structure based on the single point input — 608

No

Define a main axis of the structure based on the multi-point input — 610

Determine a two-dimensional plane along the main axis — 612

Generate a second image of the three-dimensional object along the two-dimensional plane — 614

End

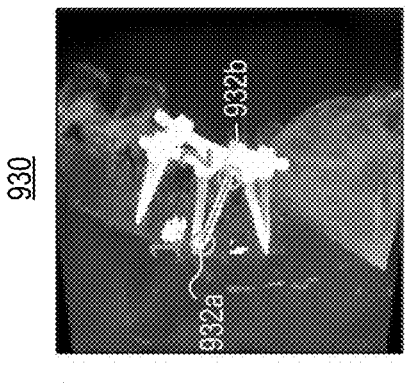
Figure 9A
Figure 9B
Figure 9C

SYSTEM AND METHOD FOR DIAGNOSTIC IMAGING

TECHNICAL FIELD

Embodiments disclosed herein generally relate to systems and methods for generating a reformatted plane of a medical image.

BACKGROUND

In the medical field there are multiple imaging techniques that allow images of the internal structure of a patient or subject to be acquired without the need to perform invasive procedures on the patient or subject. Such imaging techniques are beneficial to clinicians when inserting foreign objects into the body of the patient. Often times, clinicians require multiple views of the object to determine if the object was positioned correctly.

SUMMARY

In some embodiments, a method is disclosed herein. A computing system receives a first image of a three-dimensional object in a human body. The first image of the three-dimensional object includes a structure located in the three-dimensional object. The computing system receives an indication of a location of the structure in the first image. The computing system defines a main axis of the structure based on the indication of the location of the structure and an orientation of the structure. The computing system determines a two-dimensional plane along the main axis of the structure. The computing system generates a second image of the three-dimensional object and the structure along the two-dimensional plane.

In some embodiments, a system is disclosed herein. The system includes a processor and a memory. The memory has programming instructions stored thereon, which, when executed by the processor, causes the system to perform operations. The operations include causing display of a user interface comprising a first image of a three-dimensional object in a human body. The first image of the three-dimensional object includes a structure located in the three-dimensional object. The operations further include receiving, via the user interface, an indication of a location of the structure. The operations further include defining a main axis of the structure based on the indication of the location of the structure and an orientation of the structure. The operations further include determining a two-dimensional plane along the main axis of the structure. The operations further include generating a second image of the three-dimensional object and the structure along the two-dimensional plane. The operations further include causing display of the second image.

In some embodiments, a non-transitory computer readable medium is disclosed herein. The non-transitory computer readable medium has one or more sequences on instruction stored thereon which, when executed by a processor, causes a computing system to perform operations. The operations include causing, by the computing system, display of a user interface comprising a first image of a three-dimensional object in a human body. The first image of the three-dimensional object comprises a structure located in the three-dimensional object. The operations further include receiving, by the computing system via the user interface, an indication of a location of the structure selecting the structure. The operations further include defining, by the computing system, a main axis of the structure based on the indication of the location of the structure and an orientation of the structure. The operations further include determining, by the computing system, a two-dimensional plane along the main axis of the structure. The operations further include generating, by the computing system, a second image of the three-dimensional object and the structure along the two-dimensional plane. The operations further include causing, by the computing system, display of the second image.

BRIEF DESCRIPTION OF THE FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

FIG. 6 is a flow diagram illustrating a method of generating a reformatted plane based on a user input to an input image, according to example embodiments.

FIG. 9A is an example image, according to example embodiments.

FIG. 9B is an example image, according to example embodiments.

FIG. 9C is an example image, according to example embodiments.

Figure 1:
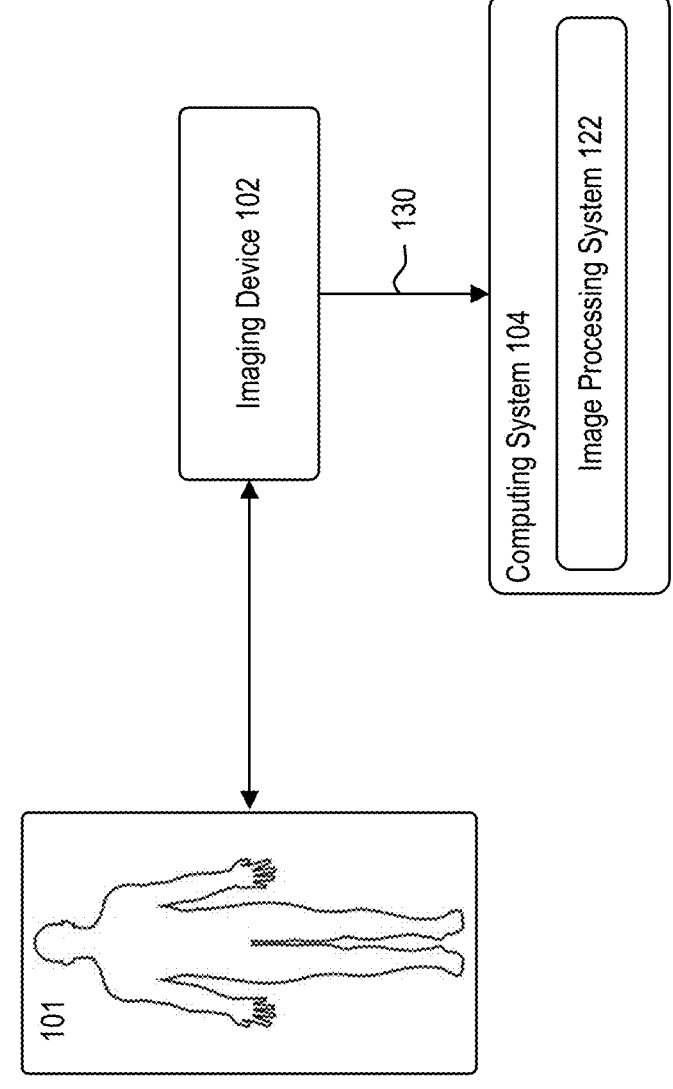
FIG. 1 is a block diagram illustrating a diagnostic environment, according to example embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

In the context of three-dimensional medical image visualization, there is often a need to create a specific oblique view from a three-dimensional volume to better visualize a structure of interest. Using a first example, in the context of an orthopedic computerized topography (CT), it is often beneficial to obtain an oblique view of an inserted pedicle screw. For example, a clinician may need to visualize the position of the screw with respect to the vertebra pedicle in a two-dimensional reformatted image defined by the main axis of the screw. Using a second example, in vascular imaging, it is often beneficial to generate a reformatted plane aligned to the main axis of a given vessel. In both examples, it is often tedious and time consuming to manually obtain the reformatted planes using conventional techniques, such as a double oblique tool.

Furthermore, while there are existing workflows where reformatted planes are generated from selected user inputs, they are often proposed in the context of a specific workflow for a given application, a given anatomy, and a given type of object. Such an approach is typically proposed in a multi-step workflow where the identification of the object of interest is performed in a separate step and/or the detection and orientation of the object of interest is pre-computed.

To improve upon conventional processes, one or more techniques disclosed herein provide a one-click approach to generating a reformatted plane of an object of interest. For example, one or more techniques provided herein generate or calculate a reformatted plane of an object of interest based on a principal axis corresponding to an objected detected in a location corresponding to the user's input. The benefit of such approach is that it is not tied to any specific workflow or type of image content. Instead, the present approach may be utilized in any visualization platform as a tool that can be used for a wide range of applications (e.g., orthopedic, vascular, neurology, etc.) and objects (e.g., wires, screws, needles, vessels, etc.). In this manner, computing systems no longer need to store multiple workflows for multiple applications, thus providing the computing system with additional space for memory allocation to other processes, resulting in a more efficient computing system. In such embodiments, the main axis calculation may be performed in real-time or near real-time based on the user input to propose the best main axis for computing the reformatted plane of the object.

Furthermore, such approach provides a semi-automatic alternative to a process that is traditionally a manual work-flow. Accordingly, rather than requiring scrolling and adjusting of oblique views to achieve a desired output, such process can be replicated through a simple single point input.

FIG. 1 is a block diagram illustrating a diagnostic environment 100, according to example embodiments. As shown, diagnostic environment 100 may include a patient 101, an imaging device 102, and a computing system 104.

Imaging device 102 may be configured to perform a medical imaging process on a region of interest on patient 101. Imaging device 102 may be representative of any medical imaging device, such as but not limited to, a CT scanner, an x-ray device, a magnetic resonance imaging (MRI) device, an ultrasound device, a positron electron tomography (PET) scanning device, and the like. Generally, imaging device 102 may be representative of any medical imaging device configured to generate two-dimensional or three-dimensional images of patient 101.

Imaging device 102 may communicate with computing system 104 via one or more communication links 130. In some embodiments, one or more communication links 130 may represent a wired connection between imaging device 102 and computing system 104. In some embodiments, one or more communication links 130 may represent a wireless connection between imaging device 102 and computing system 104.

When communication links 130 represent a wireless connection, the network represented by communication links may be representative of any suitable type, including individual connections via the Internet, such as cellular or Wi-Fi networks. In some embodiments, the wireless connection may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Generally, communication links 130 may be representative of any type of computer networking arrangement used to exchange data, such as, but not limited to, the Internet, a private data network, virtual private network using a public network and/or other suitable connection(s) that enables components in diagnostic environment 100 to send and receive information therebetween.

Computing system 104 may include image processing system 122. Image processing system 122 may be configured to allow an operator to manipulate an image captured by imaging device 102. For example, image processing system 122 may allow an operator to select an object of interest in the image currently displayed to the operator. Based on the operator's input, image processing system 122 may determine a principal axis of an object of interest in a location corresponding to the operator's input. In some embodiments, the object of interest is a three-dimensional object of interest, such as a foreign object inserted into the patient. For example, the object of interest may be a screw, wire, or needle. In some embodiments, the object of interest may be a three-dimensional object of interest, such as a bone, vessel, muscle, etc. Once the principal axis of the object of interest is determined, image processing system 122 may generate a new reformatted image plane along the principal axis. In this manner, image processing system 122 may transform a three-dimensional image into a two-dimensional reformatted image based on the principal axis of the object of interest.

Figure 2A:
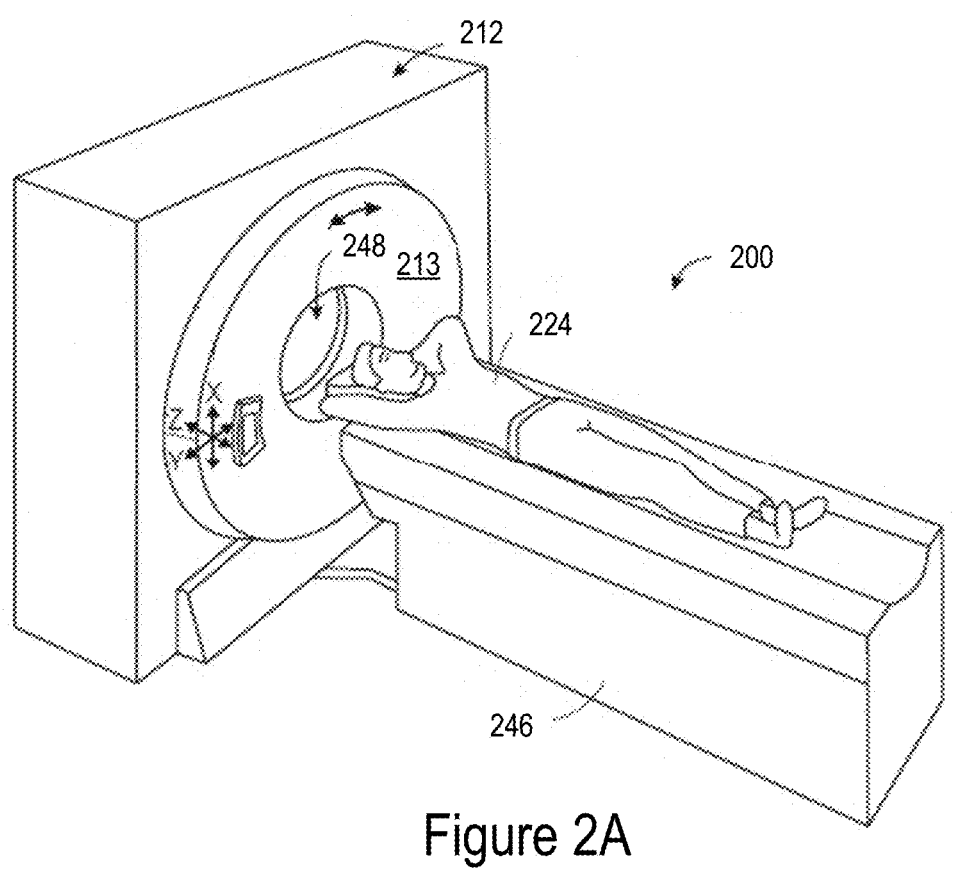
FIG. 2A shows an example hardware device for a diagnostic environment, according to example embodiments.
Figure 2B:
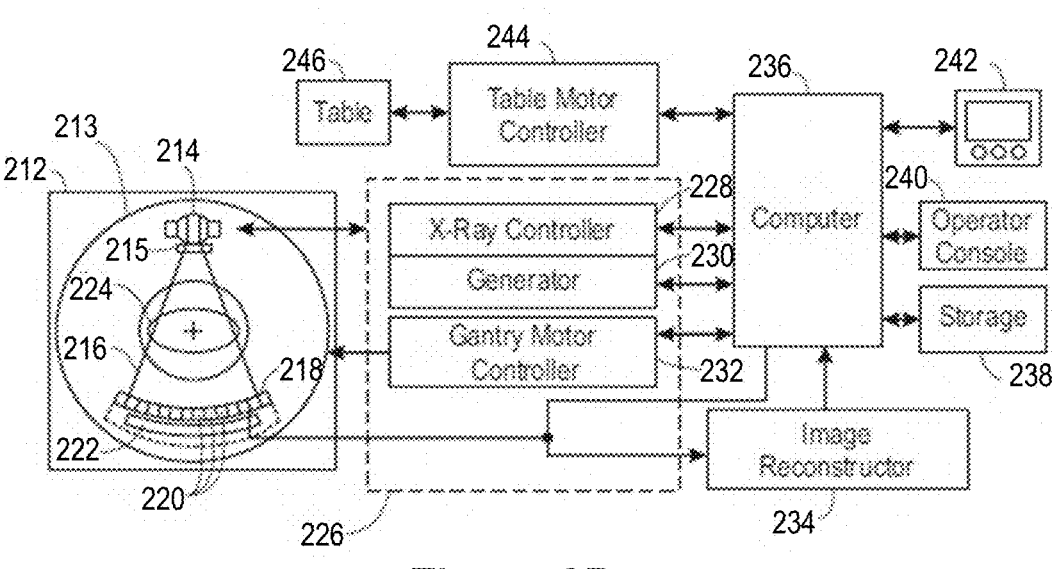
FIG. 2B shows a block diagram for the hardware device of FIG. 2A and associated software system, according to example embodiments.

FIG. 2A shows an example hardware device 200 for diagnostic environment 100, according to example embodiments. FIG. 2B shows a block diagram for hardware device 200 and associated software system, according to example embodiments. In the examples shown in FIGS. 2A-2B, hardware device 200 may be representative of a computed tomography (CT) imaging system.

Hardware device 200 may be representative of an exemplary imaging device 102, discussed above in conjunction with FIG. 1. As shown, hardware device 200 may include a gantry 212. Gantry 212 may include a rotary member 213. An x-ray source 214 that projects a beam of x-rays 216 through pre-patient collimator 215 toward a detector assembly 218 on the opposite side of the rotary member 213. X-ray source 214 may also be referred to as x-ray tube or x-ray generation component. X-ray source 214 is a type of emissions component. A main bearing (not shown) may be utilized to attach rotary member 213 to the stationary structure of the gantry 212. Detector assembly 218 is formed by a plurality of detectors 220 and data acquisition systems (DAS) 222, and can include a post-patient collimator. The plurality of detectors 220 sense the projected x-rays that pass through a patient 224. DAS 222 may convert the data to digital signals for subsequent processing. Each detector 220 may produce an analog or digital electrical signal that may represent the intensity of an impinging x-ray beam and hence the attenuated beam as it passes through patient 224. During a scan to acquire x-ray projection data, rotary member 213 and the components mounted thereon can rotate about a center of rotation.

Rotation of rotary member 213 and the operation of x-ray source 214 are governed by a control mechanism 226 of hardware device 200. Control mechanism 226 can include an x-ray controller 228 and generator 230 that provides power and timing signals to x-ray source 214 and a gantry motor controller 232 that controls the rotational speed and position of rotary member 213. An image re-constructor 234 receives sampled and digitized x-ray data from DAS 222 and performs high speed image reconstruction.

The reconstructed image is output to a computing system 236 which stores the image in a computer storage device 238. In some embodiments, computing system 236 may be representative of computing system 104. For example, computing system 236 may include an image processing system 122 stored thereon. Computing system 236 may also receive commands and scanning parameters from an operator via console 240 that has a keyboard. An associated display 242 may allow the operator to observe the reconstructed image and other data from computing system 236. The operator supplied commands and parameters are used by computing system 236 to provide control signals and information to DAS 222, x-ray controller 228 and gantry motor controller 232. In addition, computing system 236 may operate a table motor controller 244 which controls a motorized table 246 to position patient 224 in gantry 212. Particularly, table 246 moves portions of patient 224 through gantry opening 248.

Figure 3:
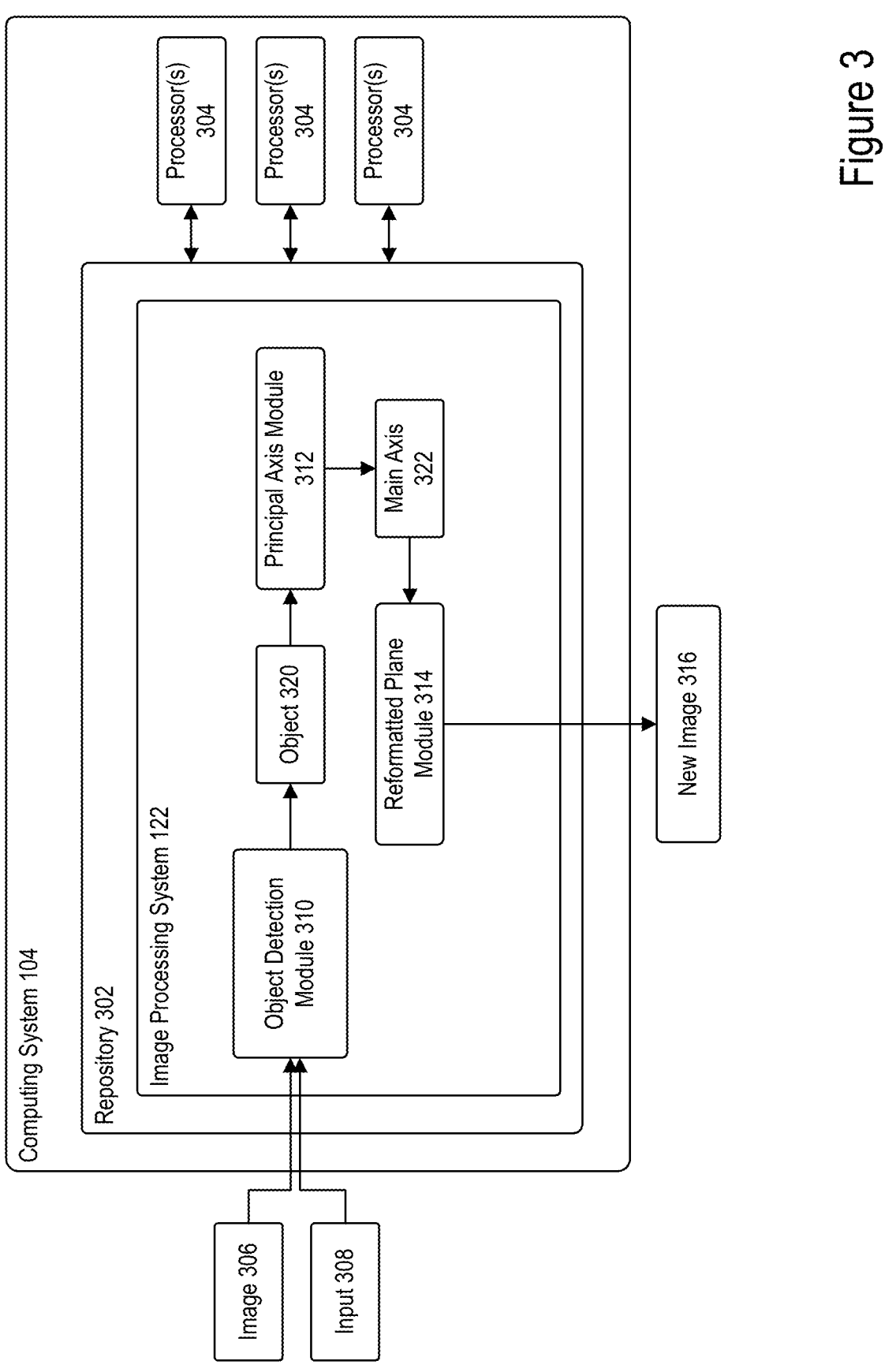
FIG. 3 is a block diagram illustrating a computing system, according to example embodiments.

FIG. 3 is a block diagram illustrating computing system 104, according to example embodiments. As shown, computing system 104 may include a repository 302 and one or more computer processors 304.

Repository 302 may be representative of any type of storage unit and/or device (e.g., a file system, database, collection of tables, or any other storage mechanism) for storing data. Further, repository 302 may include multiple different storage units and/or devices. The multiple different storage units and/or devices may or may not be of the same type or located at the same physical site. As shown, repository 302 includes at least image processing system 122. Image processing system 122 may be configured to determine a principal axis of an object of interest responsive to receiving an input from the user and generate a reformatted plane to view the object of interest.

Image processing system 122 may include an object detection module 310, a principal axis module 312, and a reformatted plane module 314. Each of object detection module 310, principal axis module 312, and reformatted plane module 314 may be comprised of one or more software modules. The one or more software modules can be collections of code or instructions stored on a media (e.g., memory of computing system 104) that represent a series of machine instructions (e.g., program code) that implements one or more algorithmic steps. Such machine instructions may be the actual computer code the processor of computing system 104 interprets to implement the instructions or, alternatively, may be a higher level of coding of the instructions that are interpreted to obtain the actual computer code.

The one or more software modules may also include one or more hardware components. One or more aspects of an example algorithm may be performed by the hardware components (e.g., circuitry) itself, rather than as a result of the instructions.

In operation, image processing system 122 may receive, as input an image 306 and an input 308 with respect to image 306. In some embodiments, image 306 may be presented to the user via a display associated with image processing system 122. For example, imaging device 102 may capture an image of patient 101. The image captured by imaging device 102 may be provided for display via a display device associated with imaging device 102 or computing system 104. In some embodiments, the image captured by imaging device 102 may be live streamed to the display device in real-time or near real-time. In some embodiments, the image captured by imaging device 102 may be a static image. Via the imaging device 102, a user may provide input to a portion of the displayed image. The input may take a variety of forms, such as, but not limited to a mouse input, a touch input, a stylus input, or the like. In some embodiments, input 308 may be a hover input, i.e., a cursor hovers over a location on the screen for a threshold period of time.

In some embodiments, input 308 may take the form of a multi-point input. For example, rather than receiving a single input (e.g., a one-click, one-tap input, hover input), input 308 may be representative of a drag and drop operation. In such embodiments, a user may provide a first input at a first location and a second input at a second location. For example, the input 308 can include, based on data received using a stylus a mouse, or any other suitable user input device, an initial input at a starting location and a second input at an end location. In some examples, the input 308 results from a selection of a user interface with the user input device as the user input device is moved or dragged from the first location to the second location. In this manner, the multi-point input detected, received, or otherwise obtained from the user input device can provide an approximation of a first location and a second location for a main axis of the object.

Based on the input, image processing system 122 may select a region surrounding the location of the user input. For example, object detection module 310 may extract a portion of the image around the user input. Object detection module 310 may then detect an object of interest (e.g., object 320) corresponding to the portion of the image selected by the user. Object detection module 310 may then be deployed to detect an object of interest in the extracted portion of the image. In some embodiments, object detection module 310 may utilize one or more image processing techniques to detect an object in the extracted portion of the image. Exemplary image processing techniques may include one or more of thresholding, hessian-based methods, morphology techniques, and connected component analysis.

Once object 320 is detected, principal axis module 312 may be configured to detect a main axis 322 of object 320. For example, principal axis module 312 may detect main axis 322 of object 320 using one or more of object segmentation, image moment calculation, and/or edge detection techniques. For example, once object 320 is segmented, principal axis module 312 may be configured to compute its inertia matrix. In some embodiments, the principal axis may be the eigenvector associated with the largest eigenvalue following the eigendecomposition of the inertia matrix.

Such object detection and main axis detection may be performed in real-time or near real-time based on the user input.

In some embodiments, such as when input 308 is a multi-point input, principal axis module 312 may detect main axis of object 320 by generating a plurality of candidate axes for object 320 based on the multi-point input. In some embodiments, principal axis module 312 may generate a plurality of candidate axes by generating an axis between two points of the multi-point input and then adding some uncertainty to the axis to generate additional candidate axes around the axis. Such process may account for the multi-point input not being as precise as it should be. Principal axis module 312 may then select, as the main axis, one of the plurality of candidate axes that best projects onto the line generated by the multi-point input. In some embodiments, principal axis module 312 may determine the candidate axis that best projects onto the line by determining the candidate axis that is closest to the main orientation of the object. For example, principal axis module 312 may suggest intermediate axis proposals if the projection of the computed main axis on the oblique plane of the multi-point input is too far from the multi-point input.

Reformatted plane module 314 can be configured to generate a reformatted image plane based on the main axis ($\vec{u}$) (e.g., main axis 322) of the object and a secondary direction ($\vec{v}$) related to the initial view orientation in the displayed image. In some embodiments, reformatted plane module 314 may generate a reformatted plane that is parallel to the main axis of the object.

As output, image processing system 122 may generate a new image 316 for display based on the reformatted plane. For example, image processing system 122 may generate a new image 316 along the reformatted plane based on the original input image 306.

In some embodiments, new image 316 may be represented as a preview, such as when input 308 is a hovering input.

Figure 4:
FIG. 4 is a block diagram illustrating a computing system, according to example embodiments.

FIG. 4 is a block diagram illustrating computing system 104, according to example embodiments. As shown, computing system 104 may include a repository 402 and one or more computer processors 404.

Repository 402 may be representative of any type of storage unit and/or device (e.g., a file system, database, collection of tables, or any other storage mechanism) for storing data. Further, repository 402 may include multiple different storage units and/or devices. The multiple different storage units and/or devices may or may not be of the same type or located at the same physical site. As shown, repository 402 includes at least image processing system 122.

In some embodiments, such as that discussed in FIG. 4, image processing system 122 may take an artificial intelligence approach to detecting an object of interest and identifying the principal axis of the object of interest.

Image processing system 122 may include an intake module 410, a training module 412, and a trained model 416. Each of intake module 410 and training module 412 may be comprised of one or more software modules. The one or more software modules are collections of code or instructions stored on a media (e.g., memory of computing system 104) that represent a series of machine instructions (e.g., program code) that implements one or more algorithmic steps. Such machine instructions may be the actual computer code the processor of computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As shown, intake module 410 may be configured to receive input data 406. Input data 406 may generally refer to a plurality of images of objects disposed in a cavity. For example, input data 406 may include both actual and synthetically generated images of objects disposed in a cavity. The plurality of objects may include, but are not limited to, wires, screws, needles, and vessels. In some embodiments, the plurality of images may include images captured using a variety of imaging techniques. For example, the plurality of images may include images captured using imaging techniques, such as, but not limited to, CT scanning, x-ray, MRI, ultrasound, PET, and the like. In some embodiments, the plurality of images may include both two-dimensional images and three-dimensional images. In some embodiments, the plurality of images may be captured under different signal-to-noise ratios. In some embodiments, input data 406 may include non-diagnostic images. For example, input data 406 may include actual or synthetically generated images that include highly asymmetrical objects. Based on input data 406, intake module 410 may generate a training data set for training machine learning model 414.

Training module 412 may train machine learning model 414 to detect an object and identify a main axis of an object in a given image based on the training data set. For example, based on the training data set, machine learning model 414 may learn to detect and segment a given object within an image. In some embodiments, machine learning model 414 may learn how to derive the main axis of the object from the segmentation. In some embodiments, machine learning model 414 may be representative of a machine learning model capable of receiving, as input, an image for analysis. For example, machine learning model 414 may be representative of a convolutional neural network, you only look once (YOLO) model, a single shot detector model, RetinaUNet, and the like.

Once machine learning model 414 attains a threshold level of accuracy, training module 412 may output a trained model 416 for deployment in image processing system 122. For example, trained model 416 may be utilized be end users for detecting objects of interest and their main axes.

Figure 5:
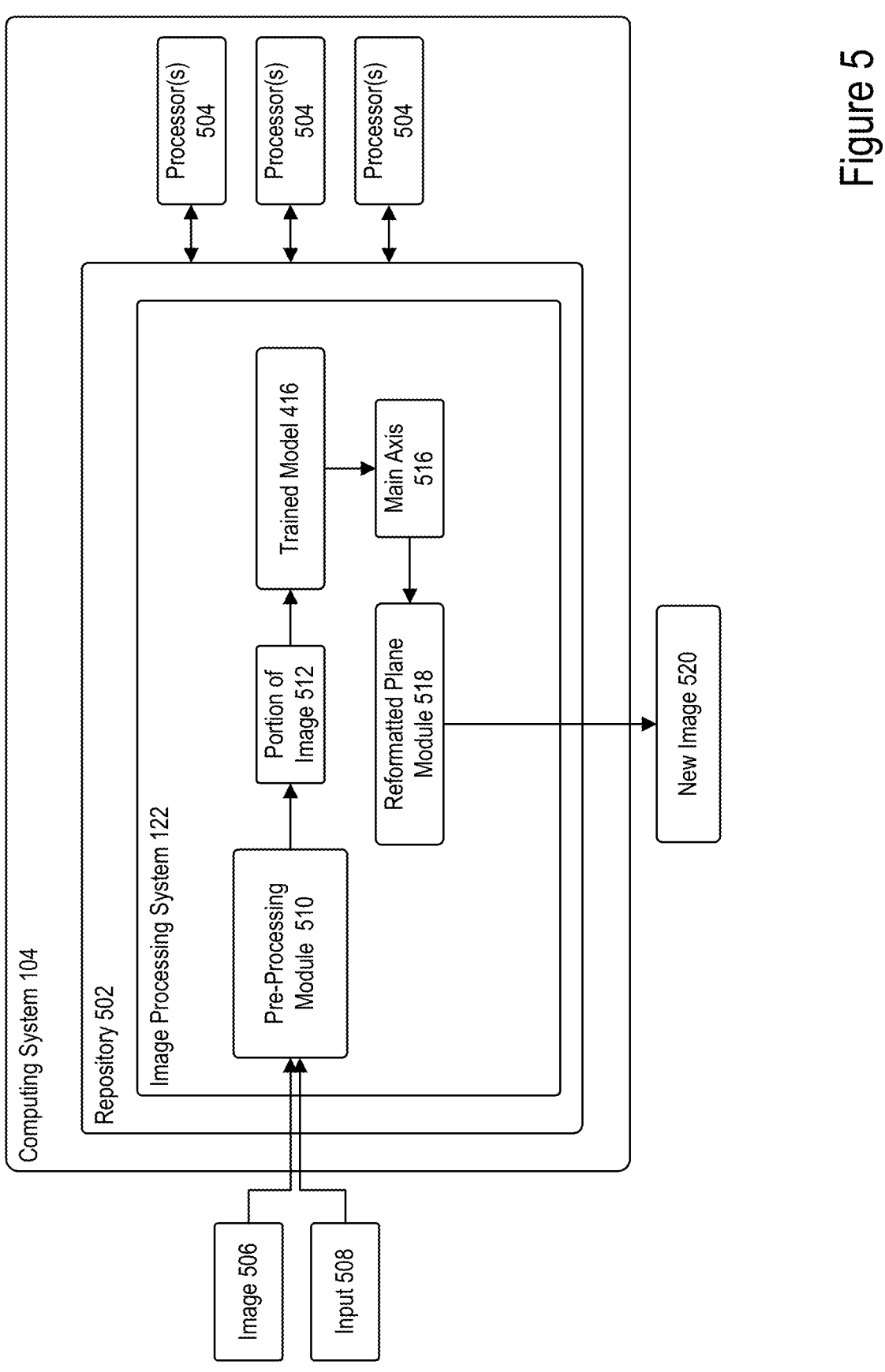
FIG. 5 is a block diagram illustrating a computing system, according to example embodiments.

FIG. 5 is a block diagram illustrating computing system 104, according to example embodiments. As shown, FIG. 5 may represent computing system 104 following the training process described above in conjunction with FIG. 5, when trained model 416 is deployed. As shown, computing system 104 may include a repository 502 and one or more computer processors 504.

Repository 502 may be representative of any type of storage unit and/or device (e.g., a file system, database, collection of tables, or any other storage mechanism) for storing data. Further, repository 502 may include multiple different storage units and/or devices. The multiple different storage units and/or devices may or may not be of the same type or located at the same physical site.

As shown, repository 502 includes at least image processing system 122. Image processing system 122 may be configured to determine a principal axis of an object of interest responsive to receiving an input from a user input device and generate a reformatted plane to view the object of interest.

Image processing system 122 may include a pre-processing module 510, trained model 416, and a reformatted plane module 518. Each of pre-processing module 510 and reformatted plane module 518 may be comprised of one or more software modules. The one or more software modules are collections of code or instructions stored on a media (e.g., memory of computing system 104) that represent a series of machine instructions (e.g., program code) that implements one or more algorithmic steps. Such machine instructions may be the actual computer code the processor of computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

In operation, image processing system 122 may receive, as input an image 506 and an input 508 with respect to image 506. In some embodiments, image 506 may be presented to the user via a display associated with image processing system 122. For example, imaging device 102 may capture an image of patient 101. The image captured by imaging device 102 may be provided for display via a display device associated with imaging device 102 or computing system 104. In some embodiments, the image captured by imaging device 102 may be live streamed to the display device in real-time or near real-time. In some embodiments, the image captured by imaging device 102 may be a static image. Imaging device 102 may receive a user input, via a user input device (e.g., stylus, mouse, etc.), with respect to a portion of the displayed image. In some embodiments, input 508 may be a hover input, i.e., a cursor hovers over a location on the screen for a threshold period of time.

In some embodiments, input 508 may be a multi-point input. In some embodiments, the multi-point input may be used by trained model 416 to determine a smaller-sized path from the image on which to compute the machine learning algorithm. In some embodiments, the drag direction of the multi-point input may be a factor considered by trained model 416 in identifying the main axis.

In some embodiments, based on the input, image processing system 122 may select a region surrounding the location of the user input. For example, a pre-processing module 510 may pre-process image 506 prior to input to trained model 416 by extracting a portion of the image 512 around the user input. Pre-processing module 510 may then provide portion of the image 512 to trained model 416 for analysis.

Trained model 416 may then receive, as input, portion of the image 512 generated by pre-processing module 510. Based on portion of the image 512, trained model 416 may identify an object of interest contained therein and a main axis 516 of the object of interest. Such object detection and main axis detection may be performed in real-time or near real-time based on the user input.

Reformatted plane module 518 is configured to generate a reformatted image plane based on the main axis ($\vec{u}$) of the object determined by trained model 416 and a secondary direction ($\vec{v}$) related to the initial view orientation in the displayed image. In some embodiments, reformatted plane module 518 may generate a reformatted plane based on the main axis and the secondary direction.

As output, image processing system 122 may generate a new image 520 for display based on the reformatted plane. For example, image processing system 122 may generate a new image 520 along the reformatted plane based on the original input image 506. In some embodiments, new image 520 may be represented as a real-time preview, such as when input 508 is a hovering input.

FIG. 6 is a flow diagram illustrating a method 600 of generating a reformatted plane based on a user input to an input image, according to example embodiments. Method 600 may begin at step 602.

At step 602, computing system 104 receives a first image from imaging device 102. For example, imaging device 102 may capture an image of patient 101. The image captured by imaging device 102 may be provided for display via a display device associated with imaging device 102 or computing system 104. In some embodiments, the image captured by imaging device 102 may be live streamed to the display device in real-time or near real-time. In some embodiments, the image captured by imaging device 102 may be a static image. In some embodiments, the first image may be a three-dimensional image of an object at least partially disposed inside a human cavity. In some embodiments, the first image may be a two-dimensional image of an object at least partially disposed inside a human cavity.

At step 604, computing system 104 may receive a user input indicating a location of an object of interest in the first image. For example, as discussed above, the image received from imaging device 102 may be displayed to a user or operator via a display associated with image processing system 122. The user input may be received via a user input device interacting with a portion of the displayed image.

At step 606, computing system 104 may determine a type of input associated with the user input. For example, at step 606, computing system 104 may determine whether the input is a single point input or a multi-point input. For example, as discussed above, rather than receiving a single input (e.g., a one-click, one-tap input, hover input), the user input can include a first input at a starting location and a second input at an end location. For example, the user input may result from a selection of a user interface with the user input device as the user input device is moved or dragged from the first location to the second location. In this manner, the multi-point input detected, received, or otherwise obtained from the user input device can provide an approximation of a first location and a second location for a main axis of the object. If, at step 606, computing system 104 determines that the user input is a single point input, then method 600 may proceed to step 608.

At step 608, computing system 104 may define a main axis of the structure based on the single point user input. In some embodiments, to define a main axis of the structure, image processing system 122 may select a region surrounding the location of the user input. For example, image processing system 122 may extract a portion of the image around the user input. Based on the extracted region, image processing system 122 may then detect an object of interest.

In some embodiments, image processing system 122 may detect the object of interest using one or more image processing techniques. In such embodiments, the main axis of image processing system 122 may then be determined using one or more object segmentation, image moment calculation, or edge detection techniques. For example, image processing system 122 may implement a segmentation method based on thresholding inside a region surrounding the single point user input. Based on the thresholding, image processing system 122 may derive a local orientation of the object of interest.

If, however, at step 606, computing system 104 determines that the user input is a multi-point user input, then method 600 may proceed to step 610. At step 610, computing system 104 may define a main axis of the structure based on the multi-point user input. In some embodiments, image processing system 122 may detect main axis of the structure by generating a plurality of candidate axes for structure based on the multi-point input. Image processing system 122 may then select, as the main axis, one of the plurality of candidate axes that best projects onto the line generated by the multi-point input.

At step 612, computing system 104 may determine a two-dimensional plane along the main axis. For example, image processing system 122 may generate a reformatted image plane based on the main axis ($\vec{u}$) of the object and a secondary direction ($\vec{v}$) related to the initial view orientation in the displayed image. In some embodiments, image processing system 122 may generate a reformatted plane based on the main axis and the secondary direction.

At step 614, computing system 104 may generate a second image of the three-dimensional object along the two-dimensional plane. For example, image processing system 122 may generate a new image along the reformatted plane based on the original input image.

Figure 7:
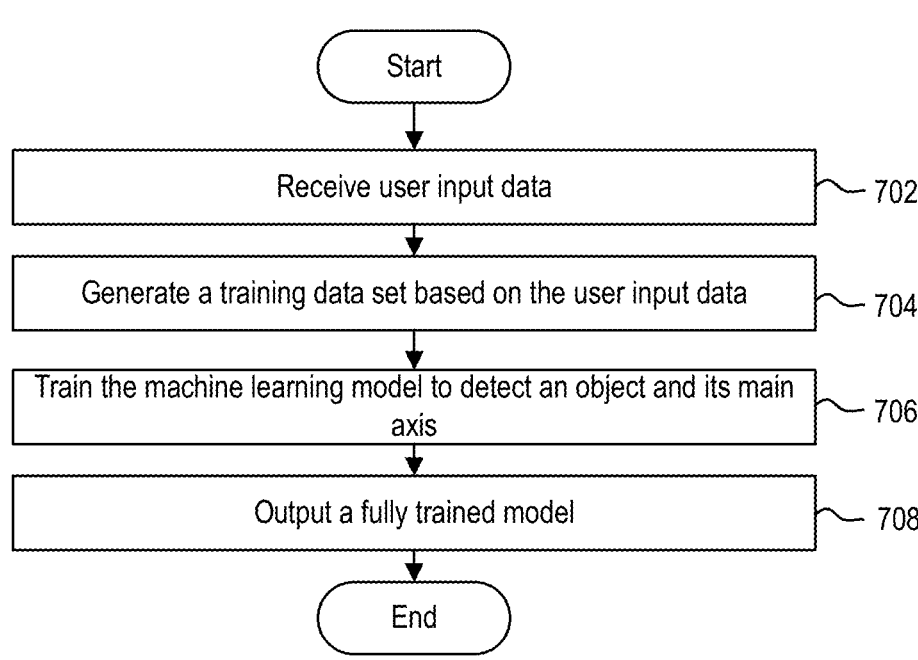
FIG. 7 is a flow diagram illustrating a method of training a prediction model to identify an object and its main axis, according to example embodiments.

FIG. 7 is a flow diagram illustrating a method 700 of training a prediction model to identify an object and its main axis, according to example embodiments. Method 700 may begin at step 702.

At step 702, computing system 104 may receive user input data. Input data may generally refer to a plurality of images of objects disposed in a cavity. For example, input data may include both actual and synthetically generated images of objects disposed in a cavity. The plurality of objects may include, but are not limited to, wires, screws, needles, and vessels. In some embodiments, the plurality of images may include images captured using a variety of imaging techniques. For example, the plurality of images may include images captured using imaging techniques, such as, but not limited to, CT scanning, x-ray, MRI, ultrasound, PET, and the like. In some embodiments, the plurality of images may include both two-dimensional images and three-dimensional images. In some embodiments, the plurality of images may be captured under different signal-to-noise ratios. In some embodiments, input data may include non-diagnostic images. For example, input data may include actual or synthetically generated images that include highly asymmetrical objects.

At step 704, computing system 104 may generate a training data set based on the user input data. For example, image processing system 122 may generate a training data set for a training machine learning model. In some embodiments, generating the training data set may include processing the input data into a standardized format. For example, image processing system 122 may convert all images into grey scale prior to training the machine learning model. In another example, image processing system 122 may convert all images to the same resolution by performing one or more upscaling or downscaling techniques.

At step 706, computing system 104 may train the machine learning model to detect an object and identify its main axis based on the training data set. For example, a training module may train the machine learning model using one or more supervised or unsupervised training techniques. In some embodiments, the machine learning model may be representative of a machine learning model capable of receiving, as input, an image for analysis. For example, machine learning model may be representative of a convolutional neural network, you only look once (YOLO) model, a single shot detector model, and the like.

At step 708, computing system 104 may output a fully trained model for deployment. For example, based on the training process, once the machine learning model exhibits a threshold level of accuracy or reliability, computing system 104 may deploy the fully trained model in a real-time environment for identify objects of interest and determining their main axes.

Figure 8:
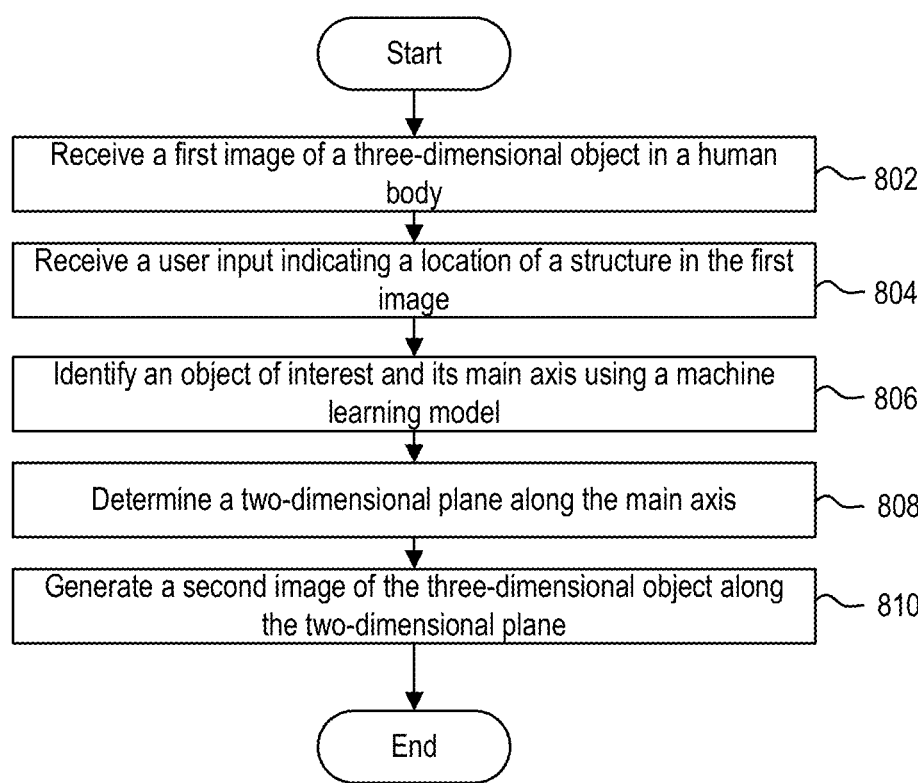
FIG. 8 is a flow diagram illustrating a method of generating a reformatted plane based on a user input to an input image, according to example embodiments.

FIG. 8 is a flow diagram illustrating a method 800 of generating a reformatted plane based on a user input to an input image, according to example embodiments. Method 800 may begin at step 802.

At step 802, computing system 104 may receive a first image from imaging device 102. For example, imaging device 102 may capture an image of patient 101. The image captured by imaging device 102 may be provided for display via a display device associated with imaging device 102 or computing system 104. In some embodiments, the image captured by imaging device 102 may be live streamed to the display device in real-time or near real-time. In some embodiments, the image captured by imaging device 102 may be a static image. In some embodiments, the first image may be a three-dimensional image of an object at least partially disposed inside a human cavity. In some embodiments, the first image may be a two-dimensional image of an object at least partially disposed inside a human cavity.

At step 804, computing system 104 may receive a user input indicating a location of an object of interest in the first image. For example, as discussed above, the image received from imaging device 102 may be displayed to a user or operator via a display associated with image processing system 122. The user input may be received via a user input device interacting with a portion of the displayed image.

At step 806, computing system 104 may identify an object of interest and its main axis based on the user input. For example, based on the portion of the image, image processing system 122 may utilize a trained machine learning model to identify the object of interest contained therein and the main axis of the object of interest. In some embodiments, image processing system 122 may identify the object of interest through a segmentation process where local features, such as but not limited to intensity values, texture, etc., are determined around the user input. In some embodiments, image processing system 122 may utilize a segmentation model and select one of the segmented objects based on the user input to determine the object of interest. In some embodiments, image processing system 122 may generate an inertia matrix for the object of interest and extract eigenvectors therefrom, where the extracted eigenvectors may indicate the main axis of the object of interest. In some embodiments, image processing system 122 may utilize a mesh of the object of interest to identify the main axis of the object of interest.

At step 808, computing system 104 may determine a two-dimensional plane along the main axis. For example, image processing system 122 may generate a reformatted image plane based on the main axis ($\vec{u}$) of the object and a secondary direction ($\vec{v}$) related to the initial view orientation in the displayed image. In some embodiments, image processing system 122 may generate a reformatted plane based on the intersection of the main axis and the secondary direction.

At step 810, computing system 104 may generate a second image of the three- dimensional object along the two-dimensional plane. For example, image processing system 122 may generate a new image along the reformatted plane based on the original input image.

FIG. 9A is an example image 900, according to example embodiments. As shown, image 900 may be an image captured by imaging device 102. In some embodiments, image 900 may be displayed to an end user or operator. As shown, image 900 includes a plurality of screws inserted into the vertebrae of a patient. Each screw may be representative of an object of interest. When image 900 is displayed to a user, the user input may include a single denoted reference numeral 902. Based on the location of single user input 902, image processing system 122 may generate a new image in accordance with a determined reformatted plane.

FIG. 9B is an example image 930, according to example embodiments. As shown, image 930 may be an image captured by imaging device 102. In some embodiments, image 930 may be displayed to an end user or operator. As shown, image 930 is the same image as image 900. However, when image 930 is displayed to a user, the user input may include multiple inputs 932a, 932b. Based on the locations of multiple inputs 932a and 932b, image processing system 122 may generate a plurality of candidate axes for generating a new image in accordance with a determined reformatted plane.

FIG. 9C is an example image 950, according to example embodiments. As shown, image 930 may be generated by image processing system 122 based on any of image 900, image 930, and respective inputs. Image 950 may illustrate the object of interest along the determined reformatted plane.

Figures 10A, 10B:
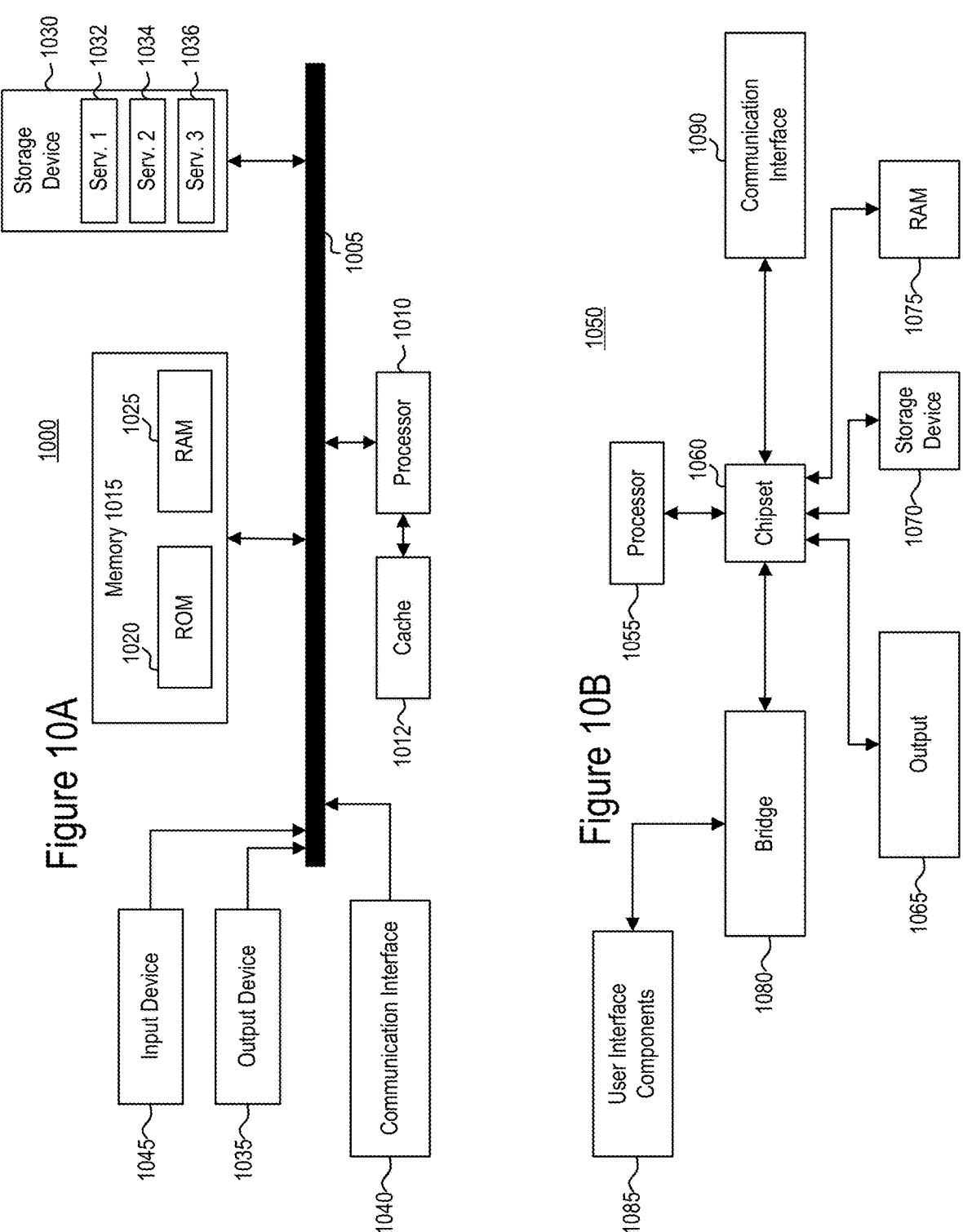
FIG. 10A is a block diagram illustrating a computing device, according to example embodiments of the present disclosure.
FIG. 10B is a block diagram illustrating a computing device, according to example embodiments of the present disclosure.

FIG. 10A illustrates a system bus architecture of computing system 1000, according to example embodiments. System 1000 may be representative of at least computing system 104. One or more components of system 1000 may be in electrical communication with each other using a bus 1005. System 1000 may include a processing unit (CPU or processor) 1010 and a system bus 1005 that couples various system components including the system memory 1015, such as read only memory (ROM) 1020 and random-access memory (RAM) 1025, to processor 1010.

System 1000 may include a cache of high-speed memory connected directly with, in close proximity to, or integrated as part of processor 1010. System 1000 may copy data from memory 1015 and/or storage device 1030 to cache 1012 for quick access by processor 1010. In this way, cache 1012 may provide a performance boost that avoids processor 1010 delays while waiting for data. These and other modules may control or be configured to control processor 1010 to perform various actions. Other system memory 1015 may be available for use as well. Memory 1015 may include multiple different types of memory with different performance characteristics. Processor 1010 may include any general-purpose processor and a hardware module or software module, such as service 1 1032, service 2 1034, and service 3 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 may represent any number of input mechanisms, such as a microphone for speech, a touch-sensitive screen for gesture or graphical input, keyboard, mouse, motion input, speech and so forth. An output device 1035 may also be one or more of a number of output mechanisms known to those of skill in the art. In some instances, multimodal systems may enable a user to provide multiple types of input to communicate with computing system 1000. Communications interface 1040 may generally govern and manage the user input and system output. There is no restriction on operating on any particular hardware arrangement and therefore the basic features here may easily be substituted for improved hardware or firmware arrangements as they are developed.

Storage device 1030 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1025, read only memory (ROM) 1020, and hybrids thereof.

Storage device 1030 may include services 1032, 1034, and 1036 for controlling the processor 1010. Other hardware or software modules are contemplated. Storage device 1030 may be connected to system bus 1005. In one aspect, a hardware module that performs a particular function may include the software component stored in a computer-readable medium in connection with the necessary hardware components, such as processor 1010, bus 1005, output device 1035 (e.g., display), and so forth, to carry out the function.

FIG. 10B illustrates a computer system 1050 having a chipset architecture that may represent at least computing system 104. Computer system 1050 may be an example of computer hardware, software, and firmware that may be used to implement the disclosed technology. System 1050 may include a processor 1055, representative of any number of physically and/or logically distinct resources capable of executing software, firmware, and hardware configured to perform identified computations. Processor 1055 may communicate with a chipset 1060 that may control input to and output from processor 1055.

In this example, chipset 1060 outputs information to output 1065, such as a display, and may read and write information to storage device 1070, which may include magnetic media, and solid-state media, for example. Chipset 1060 may also read data from and write data to storage device 1075 (e.g., RAM). A bridge 1080 for interfacing with a variety of user interface components 1085 may be provided for interfacing with chipset 1060. Such user interface components 1085 may include a keyboard, a microphone, touch detection and processing circuitry, a pointing device, such as a mouse, and so on. In general, inputs to system 1050 may come from any of a variety of sources, machine generated and/or human generated.

Chipset 1060 may also interface with one or more communication interfaces 1090 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1055 analyzing data stored in storage device 1070 or storage device 1075. Further, the machine may receive inputs from a user through user interface components 1085 and execute appropriate functions, such as browsing functions by interpreting these inputs using processor 1055.

It may be appreciated that example systems 1000 and 1050 may have more than one processor 1010 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
   receiving, by a computing system, a first image of a three-dimensional object in a human body, wherein the first image of the three-dimensional object comprises a structure located in the three-dimensional object;
   receiving, by the computing system, an indication of a location of the structure in the first image, said receiving comprising receiving a multi-point input on the location of the structure as displayed on a user interface, wherein the multi-point input is a drag and drop input;
   defining, by the computing system, a main axis of the structure based on the indication and an orientation of the structure, said defining comprising:
   generating a plurality of candidate axes for the structure based on the multi-point input; and
   identifying, as the main axis, an axis of the plurality of candidate axes that is closest to a line generated by the multi-point input in the first image;
   determining, by the computing system, a two-dimensional plane along the main axis of the structure; and
   generating, by the computing system, a second image of the three-dimensional object and the structure along the two-dimensional plane.

2. The method of claim 1, wherein the indication of the location of the structure comprises a cursor hovering over the location of the structure.

3. The method of claim 2, further comprising:
   generating a real-time preview of the second image for display while the cursor continues hovering over the location of the structure, the real-time preview comprising the three-dimensional object and the structure along the two-dimensional plane.

4. The method of claim 1, wherein defining, by the computing system, the main axis of the structure comprises:

identifying a further location of the indication with respect to the first image;
detecting the structure in the further location of the indication; and
identifying the main axis of the structure based on the detecting.

5. The method of claim 4, wherein identifying the main axis comprises:
   identifying a starting location of the structure;
   identifying an end location of the structure; and
   defining the main axis between the starting location and the end location.

6. A system comprising:
   a processor; and
   a memory having programming instructions stored thereon, which, when executed by the processor, causes the system to perform operations comprising:
      causing display of a user interface comprising a first image of a three-dimensional object in a human body, wherein the first image of the three-dimensional object comprises a structure located in the three-dimensional object;
      receiving, via the user interface, an indication of a location of the structure, said receiving comprising receiving a multi-point input on the location of the structure as displayed on a user interface;
   defining a main axis of the structure based on the indication of the location of the structure and an orientation of the structure, said defining comprising:
      generating a plurality of candidate axes for the structure based on the multi-point input; and
      identifying, as the main axis, an axis of the plurality of candidate axes that is closest to a line generated by the multi-point input in the first image;
      determining a two-dimensional plane along the main axis of the structure;
      generating a second image of the three-dimensional object and the structure along the two-dimensional plane; and
      causing display of the second image.

7. The system of claim 6, wherein the indication of the location of the structure comprises a cursor hovering over the location of the structure.

8. The system of claim 7, further comprising:
   generating a real-time preview of the second image for display while the cursor continues hovering over the location of the structure.

9. The system of claim 6, wherein defining the main axis of the structure comprises:
   identifying a further location of the indication with respect to the first image;
   detecting the structure in the further location of the indication; and
   identifying the main axis of the structure based on the detecting.

10. The system of claim 9, wherein identifying the main axis comprises:
    identifying a starting location of the structure;
    identifying an end location of the structure; and
    defining the main axis between the starting location and the end location.

11. A non-transitory computer readable medium comprising programming instruction stored thereon which, when executed by a processor, causes a computing system to perform operations comprising:
    causing, by the computing system, display of a user interface comprising a first image of a three-dimensional object in a human body, wherein the first image of the three-dimensional object comprises a structure located in the three-dimensional object;

receiving, by the computing system via the user interface, an indication of a location of the structure, said receiving comprising receiving a multi-point input on the location of the structure as displayed on a user interface;

defining, by the computing system, a main axis of the structure based on the indication of the location of the structure and an orientation of the structure, said defining comprising:

generating a plurality of candidate axes for the structure based on the multi-point input; and identifying, as the main axis, an axis of the plurality of candidate axes that is closest to a line generated by the multi-point input in the first image;

determining, by the computing system, a two-dimensional plane along the main axis of the structure;

generating, by the computing system, a second image of the three-dimensional object and the structure along the two-dimensional plane; and causing, by the computing system, display of the second image.

12. The non-transitory computer readable medium of claim 11, wherein the indication of the location of the structure comprises a cursor hovering over the location of the structure and the operations further comprises:

generating a real-time preview of the second image for display while the cursor continues hovering over the location of the structure.

13. The non-transitory computer readable medium of claim 11, wherein defining, by the computing system, the main axis of the structure comprises:

identifying a further location of the indication with respect to the first image;

detecting the structure in the further location of the indication; and identifying the main axis of the structure based on the detecting.

14. The non-transitory computer readable medium of claim 13, wherein identifying the main axis comprises:

identifying a starting location of the structure;

identifying an end location of the structure; and defining the main axis between the starting location and the end location.

* * * * *